(12) United States Patent
Wang et al.

(10) Patent No.: US 11,968,297 B2
(45) Date of Patent: Apr. 23, 2024

(54) ONLINE PRIVACY PRESERVING TECHNIQUES

(71) Applicant: Google LLC, Mountain View, CA (US)

(72) Inventors: Gang Wang, Jersey City, NJ (US); Ardian Poernomo, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 256 days.

(21) Appl. No.: 17/637,849

(22) PCT Filed: Aug. 13, 2021

(86) PCT No.: PCT/US2021/045888
§ 371 (c)(1),
(2) Date: Feb. 24, 2022

(87) PCT Pub. No.: WO2022/036183
PCT Pub. Date: Feb. 17, 2022

(65) Prior Publication Data
US 2022/0278828 A1 Sep. 1, 2022

Related U.S. Application Data

(60) Provisional application No. 63/065,849, filed on Aug. 14, 2020.

(51) Int. Cl.
*H04L 9/08* (2006.01)
(52) U.S. Cl.
CPC .......... *H04L 9/085* (2013.01); *H04L 2209/46* (2013.01)
(58) Field of Classification Search
CPC ............... H04L 9/085; H04L 2209/46
See application file for complete search history.

(56) References Cited

U.S. PATENT DOCUMENTS

| | | | |
|---|---|---|---|
| 9,679,314 B1 | 6/2017 | Wang | |
| 2016/0050070 A1 | 2/2016 | Bohli et al. | |
| 2019/0312734 A1 | 10/2019 | Wentz et al. | |
| 2020/0259800 A1* | 8/2020 | Masny | ................. H04L 9/3242 |
| 2022/0255731 A1* | 8/2022 | Modica | ................. H04L 9/085 |

FOREIGN PATENT DOCUMENTS

| | | |
|---|---|---|
| CN | 104380690 | 2/2015 |
| CN | 104604200 | 5/2015 |

(Continued)

OTHER PUBLICATIONS

Yu, et al., "Method and Apparatus for Carrying Out Secure Multi-Party Computation by Means of Certificate Issuing", Jan. 15, 2020, WO 2021/036183 A1, pp. 1-30 (Year: 2020).*

(Continued)

*Primary Examiner* — Jonathan A Bui
(74) *Attorney, Agent, or Firm* — Fish & Richardson P.C.

(57) ABSTRACT

This document describes techniques that prevent the sharing or leakage of user information. In one aspect, a method includes receiving, by a first MPC server, a request for a selection criterion of at least one interest group to which a user of a client device belongs. The received request does not reveal an identifier of the client device to the first MPC server. In response to receiving the request, the first MPC server determines a set of ordered selection criterion of the at least one interest group retrieved from a cache of the first MPC server. The set of ordered selection criterion is transformed into a set of key/value pairs secured from being revealed by the second MPC server. The first MPC server transmits the set of key/value pairs to the second MPC server with data that enables the second MPC server to identify a key having a highest value.

20 Claims, 5 Drawing Sheets

(56) References Cited

FOREIGN PATENT DOCUMENTS

| CN | 105009505 | 10/2015 |
|---|---|---|
| CN | 106471539 | 3/2017 |
| CN | 108475281 | 8/2018 |
| CN | 108509806 | 9/2018 |
| CN | 109891424 | 6/2019 |
| CN | 110661764 | 1/2020 |
| CN | 111324895 | 6/2020 |
| JP | 2016-517069 | 6/2016 |
| JP | 2017-054539 | 3/2017 |
| JP | 2018-513459 | 5/2018 |
| WO | WO 2014/166546 | 10/2014 |

OTHER PUBLICATIONS

Chao, "Analysis of the Research Status of Privacy Protection under the Environment of Big Data" Computer Knowledge and Technology, vol. 12, No. 18, Jun. 2016, 3 pages (with English abstract).
Li-Xun et al., "Resource Recommendation Algorithm Based on K-anonymity for Generalizing User Query Requests" Computer and Telecommunication, Issue 6, Jun. 2020, 66-73 (with English abstract).
Notice of Allowance in Japanese Appln. No. 2022-518299, dated Aug. 21, 2023, 5 pages (with English translation).
Office Action in Chinese Appln. No. 202180005490.2, dated Sep. 14, 2023, 13 pages (with English translation).
Hara, "Yahoo is in full swing, Google is also entering the market power of interest-based advertising" Nikkei Net Marketing, Japan, vol. 20, May 25, 2009, 10 pages.
Office Action in Indian Appln. No. 202227010062, dated Apr. 17, 2023, 6 pages (with English translation).
Office Action in Japanese Appln. No. 2022-518299, dated May 15, 2023, 6 pages (with English translation).
PCT International Search Report and Written Opinion in International Appln. No. PCT/US2021/045888, dated Nov. 23, 2021, 14 pages.
Notice of Allowance in European Appln. No. 217695444, dated Nov. 30, 2022, 9 pages.
International Preliminary Report on Patentability in International Appln. No. PCT/US2021/045888, dated Feb. 23, 2023, 9 pages.

\* cited by examiner

ONLINE PRIVACY PRESERVING TECHNIQUES

CROSS-REFERENCE TO RELATED APPLICATIONS

This application is a National Stage Application under 35 U.S.C. § 371 and claims the benefit of International Application No. PCT/US2021/045888, filed Aug. 13, 2021, which claims priority to U.S. Provisional Application No. 63/065,849, filed Aug. 14, 2020, entitled ONLINE PRIVACY PRESERVING TECHNIQUES. The disclosures of the foregoing applications are incorporated herein by reference in their entirety.

BACKGROUND

This specification relates to data processing and protecting user privacy in an online environment. The enhancement of online user privacy has led many browser developers to change the ways in which user data is handled. For example, third party-cookies are no longer being supported by some browsers, but the deprecation of third-party cookies may lead to less relevant content being delivered to users.

SUMMARY

In general, one innovative aspect of the subject matter described in this specification is a method that includes receiving, by a first multi-party computation (MPC) server (also referred to herein as a first MPC system or first computing system) of an MPC cluster and from a second MPC server (also referred to herein as a second MPC system or a second computing system) of the MPC cluster, a request for a selection criterion of at least one interest group of a set of two or more interest groups to which a particular user of a client device belongs, wherein the received request does not reveal an identifier of the client device to either MPC system, in response to receiving the request: determining, by the first MPC server, a set of ordered selection criterion of the at least one interest group of the set of two or more interest groups to which the particular user of the client device belongs that is retrieved from a cache of the first MPC server using portions of the request that are secured from being revealed by the second MPC server, transforming the set of ordered selection criterion into a set of key/value pairs, wherein the value of each of the key/value pairs is secured from being revealed by the second MPC server, and transmitting, by the first MPC server, the set of key/value pairs to the second MPC server with data that enables the second MPC server to identify a key having a highest value without revealing the values of the set of key/value pairs to the second MPC server.

In some implementations, the method further includes receiving, by the first MPC server and from a content distribution system that differs from the first MPC server and the second MPC server, a given selection criterion of a given interest group that is predicted, by the content distribution system, to include the particular user of the client device, caching, by the first MPC server and in the cache of the first MPC server, the given selection criterion of the given interest group that is predicted to include the particular user of the client device.

In some implementations, the method further includes receiving, by the content distribution system, a content request submitted by the client device, generating, in response to the content request, a candidate selection criterion responsive to the content request, determining, based on the content request, the given interest group that is predicted to include the particular user of the client device, generating the given selection criterion of the given interest group based on the determination that the given interest group is predicted to include the particular user of the client device, transmitting, by the content distribution system, the candidate distribution criterion and the given distribution criterion to the client device, and transmitting, by the content distribution system and to the first MPC server, the given distribution criterion of the given interest group, but not the candidate distribution criterion.

In some implementations, the method further includes receiving, by the second MPC server, a first encrypted request that is inaccessible by the second MPC server, forwarding, by the second MPC server, the first encrypted request to the first MPC server, receiving, from the first MPC server, the set of key/value pairs, identifying, by the second MPC server and without revealing the values of the key/value pairs, a given key/value pair having the highest value, generating a first encrypted and signed response to the first encrypted request that includes the given key/value pair, wherein the first signed response is signed with a private key of the second MPC server, and transmitting the first encrypted and signed response to the client device responsive to the first encrypted request.

In some implementations, the method further includes receiving, by the client device, the first encrypted and signed response transmitted by the second MPC server, verifying, by the client device, that the first encrypted and signed response is signed by the first MPC server, recovering, by the client device, a first interest group from the first signed response, verifying, by the client device, that the first interest group includes the particular user, verifying, by the client device, that the value of the given key/value pair is signed by the first MPC server, decrypting, by the client device, the value of the given key/value pair to recover a first selection criterion, receiving, by the client device, the candidate selection criterion and the given selection criterion from the content distribution system, selecting, by the client device, a controlling selection criterion from among the first selection criterion, the given selection criterion, and the candidate selection criterion.

In some implementations, the method further includes delineating, by the client device, interest groups that include the particular user into a first set of interest groups and a second set of interest groups that differs from the first set of interest groups, transmitting, by the client device, the first encrypted request to the second MPC server, the first encrypted request including a first set of interest groups that include the particular user, transmitting, by the client device, a second encrypted request to the first MPC server, the second encrypted request including a second set of interest groups that include the particular user, receiving, by the client device, a second signed response transmitted by the first MPC server, verifying, by the client device, that the second signed response is signed by the second MPC server, recovering, by the client device, a specified interest group from the signed response, verifying, by the client device, that the specified interest group includes the particular user, verifying, by the client device, that the value of the given key/value pair is signed by the second MPC server, decrypting, by the client device, the value of the given key/value pair to recover a third selection criterion, wherein selecting the controlling selection criterion comprises selecting the controlling selection criterion from among the first selection criterion, the given selection criterion, the candidate selection criterion, and the third selection criterion.

In some implementations, the method further includes receiving, by the first MPC server, a second encrypted request that is inaccessible by the first MPC server, forwarding, by the first MPC server, the second encrypted request to the second MPC server, receiving, from the second MPC server, a different set of key/value pairs, identifying, by the first MPC server and without revealing the values of the key/value pairs in the different set, a particular key/value pair having the highest value, generating a second signed response to the second encrypted request that includes the particular key/value pair, wherein the first signed response is signed with a private key of the second MPC server, and transmitting the second signed response to the client device responsive to the second encrypted request.

In general, another innovative aspect of the subject matter described in this specification is a system that includes one or more processors and one or more memory elements including instructions that, when executed, cause the one or more processors to perform operations including: receiving, by a first multi-party computation (MPC) system server of an MPC cluster and from a second MPC server of the MPC cluster, a request for a selection criterion of at least one interest group of a set of two or more interest groups to which a particular user of a client device belongs, wherein the received request does not reveal an identifier of the client device to the first MPC server: in response to receiving the request: determining, by the first MPC server, a set of ordered selection criterion of the at least one interest group of the set of two or more interest groups to which the particular user of the client device belongs that is retrieved from a cache of the first MPC server using portions of the request that are secured from being revealed by the second MPC server; transforming the set of ordered selection criterion into a set of key/value pairs, wherein the value of each of the key/value pairs is secured from being revealed by the second MPC server; and transmitting, by the first MPC server, the set of key/value pairs to the second MPC server with data that enables the second MPC server to identify a key having a highest value without revealing the values of the set of key/value pairs to the second MPC server.

In some implementations, the operations (performed by the one or more processors of the system described above) further include receiving, by the first MPC server and from a content distribution system that differs from the first MPC server and the second MPC server, a given selection criterion of a given interest group that is predicted, by the content distribution system, to include the particular user of the client device; caching, by the first MPC server and in the cache of the first MPC server, the given selection criterion of the given interest group that is predicted to include the particular user of the client device.

In some implementations, the operations further include receiving, by the content distribution system, a content request submitted by the client device; generating, in response to the content request, a candidate selection criterion responsive to the content request; determining, based on the content request, the given interest group that is predicted to include the particular user of the client device; generating the given selection criterion of the given interest group based on the determination that the given interest group is predicted to include the particular user of the client device; transmitting, by the content distribution system, the candidate distribution criterion and the given distribution criterion to the client device; and transmitting, by the content distribution system and to the first MPC server, the given distribution criterion of the given interest group, but not the candidate distribution criterion.

In some implementations, the operations further include receiving, by the second MPC server, a first encrypted request that is inaccessible by the second MPC server; forwarding, by the second MPC server, the first encrypted request to the first MPC server; receiving, from the first MPC server, the set of key/value pairs; identifying, by the second MPC server and without revealing the values of the key/value pairs, a given key/value pair having the highest value; generating a first encrypted and signed response to the first encrypted request that includes the given key/value pair, wherein the first signed response is signed with a private key of the second MPC server; and transmitting the first encrypted and signed response to the client device responsive to the first encrypted request.

In some implementations, the operations further include receiving, by the client device, the first encrypted and signed response transmitted by the second MPC server; verifying, by the client device, that the first encrypted and signed response is signed by the first MPC server; recovering, by the client device, a first interest group from the first signed response; verifying, by the client device, that the first interest group includes the particular user; verifying, by the client device, that the value of the given key/value pair is signed by the first MPC server; decrypting, by the client device, the value of the given key/value pair to recover a first selection criterion; receiving, by the client device, the candidate selection criterion and the given selection criterion from the content distribution system; selecting, by the client device, a controlling selection criterion from among the first selection criterion, the given selection criterion, and the candidate selection criterion.

In some implementations, the operations further include delineating, by the client device, interest groups that include the particular user into a first set of interest groups and a second set of interest groups that differs from the first set of interest groups; transmitting, by the client device, the first encrypted request to the second MPC server, the first encrypted request including a first set of interest groups that include the particular user; transmitting, by the client device, a second encrypted request to the first MPC server, the second encrypted request including a second set of interest groups that include the particular user; receiving, by the client device, a second signed response transmitted by the first MPC server; verifying, by the client device, that the second signed response is signed by the second MPC server; recovering, by the client device, a specified interest group from the signed response; verifying, by the client device, that the specified interest group includes the particular user; verifying, by the client device, that the value of the given key/value pair is signed by the second MPC server; decrypting, by the client device, the value of the given key/value pair to recover a third selection criterion, wherein selecting the controlling selection criterion comprises selecting the controlling selection criterion from among the first selection criterion, the given selection criterion, the candidate selection criterion, and the third selection criterion.

In some implementations, the operations further include receiving, by the first MPC server, a second encrypted request that is inaccessible by the first MPC server; forwarding, by the first MPC server, the second encrypted request to the second MPC server; receiving, from the second MPC server, a different set of key/value pairs; identifying, by the first MPC server and without revealing the values of the key/value pairs in the different set, a particular key/value pair having the highest value; generating a second signed response to the second encrypted request that includes the particular key/value pair, wherein the first signed response is signed with a private key of the second MPC server; and transmitting the second signed response to the client device responsive to the second encrypted request.

In general, another innovative aspect of the subject matter described in this specification is a non-transitory computer storage medium encoded with instructions that when executed by a distributed computing system cause the distributed computing system to perform operations including: receiving, by a first multi-party computation (MPC) server of an MPC cluster and from a second MPC server of the MPC cluster, a request for a selection criterion of at least one interest group of a set of two or more interest groups to which a particular user of a client device belongs, wherein the received request does not reveal an identifier of the client device to the first MPC server; in response to receiving the request: determining, by the first MPC server, a set of ordered selection criterion of the at least one interest group of the set of two or more interest groups to which the particular user of the client device belongs that is retrieved from a cache of the first MPC server using portions of the request that are secured from being revealed by the second MPC server; transforming the set of ordered selection criterion into a set of key/value pairs, wherein the value of each of the key/value pairs is secured from being revealed by the second MPC server; and transmitting, by the first MPC server, the set of key/value pairs to the second MPC server with data that enables the second MPC server to identify a key having a highest value without revealing the values of the set of key/value pairs to the second MPC server.

In some implementations, the operations (performed by the distributed computing system) further include receiving, by the first MPC server and from a content distribution system that differs from the first MPC server and the second MPC server, a given selection criterion of a given interest group that is predicted, by the content distribution system, to include the particular user of the client device; caching, by the first MPC server and in the cache of the first MPC server, the given selection criterion of the given interest group that is predicted to include the particular user of the client device.

In some implementations, the operations further include receiving, by the content distribution system, a content request submitted by the client device; generating, in response to the content request, a candidate selection criterion responsive to the content request; determining, based on the content request, the given interest group that is predicted to include the particular user of the client device; generating the given selection criterion of the given interest group based on the determination that the given interest group is predicted to include the particular user of the client device; transmitting, by the content distribution system, the candidate distribution criterion and the given distribution criterion to the client device; and transmitting, by the content distribution system and to the first MPC server, the given distribution criterion of the given interest group, but not the candidate distribution criterion.

In some implementations, the operations further include receiving, by the second MPC server, a first encrypted request that is inaccessible by the second MPC server; forwarding, by the second MPC server, the first encrypted request to the first MPC server; receiving, from the first MPC server, the set of key/value pairs; identifying, by the second MPC server and without revealing the values of the key/value pairs, a given key/value pair having the highest value; generating a first encrypted and signed response to the first encrypted request that includes the given key/value pair, wherein the first signed response is signed with a private key of the second MPC server; and transmitting the first encrypted and signed response to the client device responsive to the first encrypted request In some implementations, the operations further include receiving, by the client device, the first encrypted and signed response transmitted by the second MPC server; verifying, by the client device, that the first encrypted and signed response is signed by the first MPC server; recovering, by the client device, a first interest group from the first signed response; verifying, by the client device, that the first interest group includes the particular user; verifying, by the client device, that the value of the given key/value pair is signed by the first MPC server; decrypting, by the client device, the value of the given key/value pair to recover a first selection criterion; receiving, by the client device, the candidate selection criterion and the given selection criterion from the content distribution system; selecting, by the client device, a controlling selection criterion from among the first selection criterion, the given selection criterion, and the candidate selection criterion.

In some implementations, the operations further include delineating, by the client device, interest groups that include the particular user into a first set of interest groups and a second set of interest groups that differs from the first set of interest groups; transmitting, by the client device, the first encrypted request to the second MPC server, the first encrypted request including a first set of interest groups that include the particular user; transmitting, by the client device, a second encrypted request to the first MPC server, the second encrypted request including a second set of interest groups that include the particular user; receiving, by the client device, a second signed response transmitted by the first MPC server; verifying, by the client device, that the second signed response is signed by the second MPC server; recovering, by the client device, a specified interest group from the signed response; verifying, by the client device, that the specified interest group includes the particular user; verifying, by the client device, that the value of the given key/value pair is signed by the second MPC server; decrypting, by the client device, the value of the given key/value pair to recover a third selection criterion, wherein selecting the controlling selection criterion comprises selecting the controlling selection criterion from among the first selection criterion, the given selection criterion, the candidate selection criterion, and the third selection criterion.

Particular embodiments of the subject matter described in this specification can be implemented to realize one or more of the following technical advantages. For example, using multi-party computation (MPC) and other cryptographic techniques to secure user data and perform content selection processes prevents user information available to the entities that participate in the process from being leaked to other entities. The techniques discussed throughout this document also secure the user information to prevent sharing of user information between the entities that would otherwise be necessary to perform the process. The techniques described in this document compartmentalize the user information and operations of the process within different computing systems to ensure that, if a computer of one entity is compromised, the amount of user information that can be accessed is minimized or at least reduced relative to other techniques. The techniques discussed throughout this document also enable personalized content selection to be performed, while preventing any of the systems involved in the content selection from being able to track an individual user across multiple websites.

The techniques discussed herein include transmitting messages that include codes in place of actual data such that the computing systems that participate in the processes discussed herein do not have access to the underlying data, but can still perform the operations of the processes using these codes. Using codes in place of actual data also protects the data even if the data is compromised, e.g., stolen or leaked to another entity. Using lookup tables and codes in this way reduces the computational burden on the computing systems used to implement the processes discussed herein relative to encryption techniques (e.g., homomorphic encryption techniques) that would otherwise be required to protect the data. This reduces the necessary central processing unit (CPU) cycles required to perform the process (e.g., by not having to encrypt and decrypt large amounts of data), reduces the latency in performing the process which is critical for implementations in which the process is used to select content for presentation on user devices, and makes the overall process more efficient. Furthermore, data can be cached locally at particular computing systems such that latency is reduced for future requests of any cached data.

Reducing the latency in content presentation also reduces the number of errors that occur at user devices while waiting for such content to arrive. As the content often needs to be provided in milliseconds and to mobile devices connected by wireless networks, reducing the latency in selecting and providing the content is critical in preventing errors and reducing user frustration.

The described techniques also provide a simplified process for maintaining a high level of privacy. By implementing the segmented process through MPC techniques, the system provides a high bar for user privacy without requiring extensive changes from demand-side platforms.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
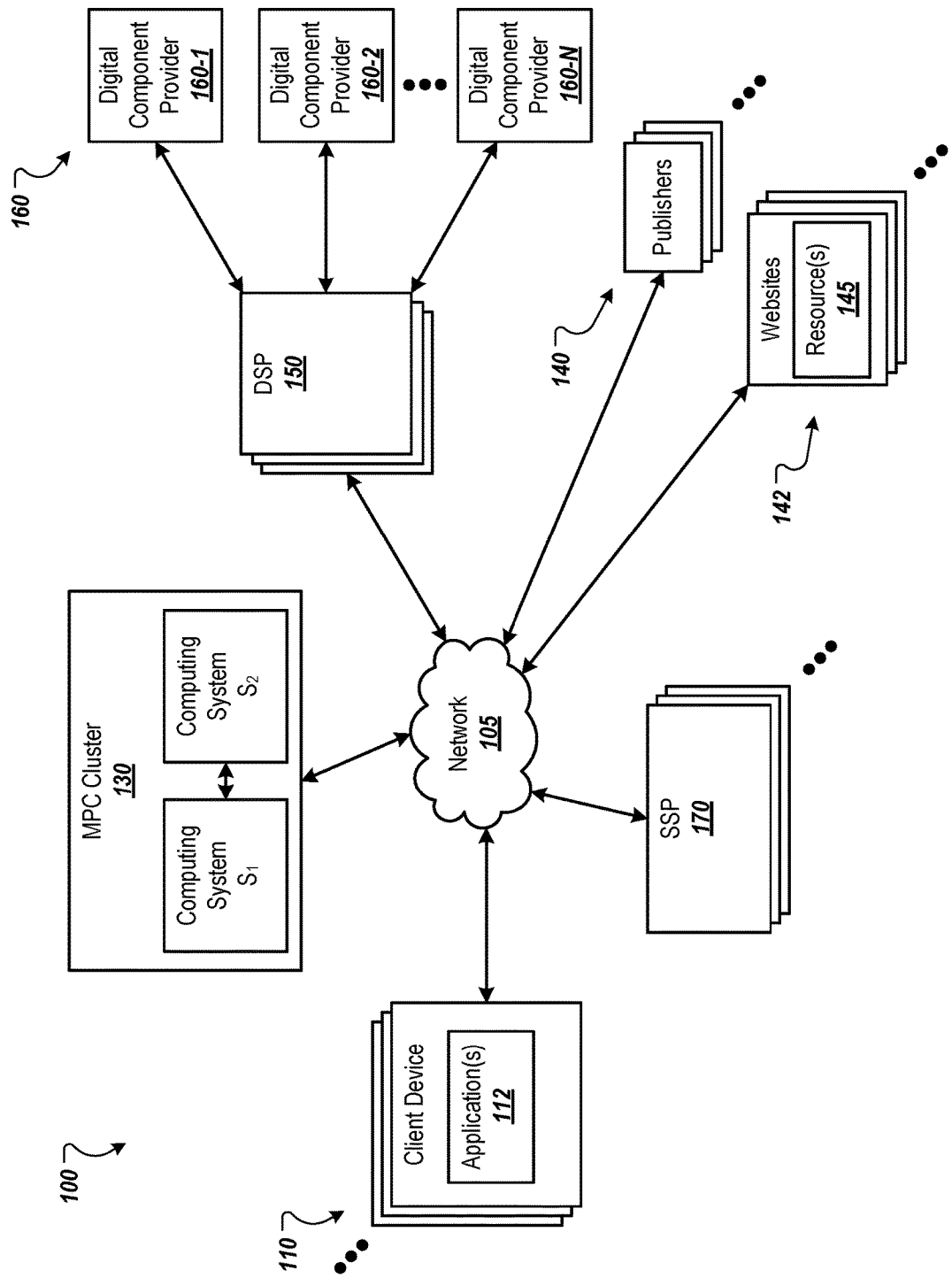
FIG. 1 is a block diagram of an example environment in which content is distributed to client devices.

This disclosure relates to computer implemented methods and systems that employ techniques that prevent the sharing or leakage of user information by entities involved in the selection and distribution of electronic content to client devices. As described in more detail below, the privacy preserving techniques can be implemented using a combination of multi-party computation (MPC), probabilistic data structures, encryption, and/or two-stage (or n-stage) caching. More specifically, a user's client device can send out three requests for personalized content. The first request can be sent to one server in a MPC cluster, the second request can be sent to a different server in the same MPC cluster, and the third request can be sent to a content distribution system. As described throughout this document, the requests sent to the two servers in the MPC cluster can be encrypted in a way such that neither of the MPC servers can obtain enough information to track the user across websites, but can still access a two-stage cache to identify available personalized content that can be provided to the user on the basis of interest groups that include the user. Each of the MPC servers may respond to the respective requests with information about one or more portions of content (e.g., digital components) that are related to one or more interest groups that include the user.

The third request sent to the content distribution system includes information related to the website the user is visiting (e.g., a URL), which can be used to identify contextual content related to the website, and also used to infer interest groups that are predicted to include the user. The identified contextual content is communicated to the client device along with information about content related to one or more of the inferred interest groups. The information about the content related to the one or more interest groups is also stored in the cache for later use by the MPC servers. The client device will select personalized content (e.g., digital components) to be presented to the user from among the information received from the two MPC servers and the content distribution system.

Further to the privacy preserving techniques discussed throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an environment 100 in which content is distributed to client devices 110. The example environment 100 includes a data communication network 105, such as a local area network (LAN), a wide area network (WAN), the Internet, a mobile network, or a combination thereof. The network 105 connects the client devices 110, an MPC cluster 130, demand-side platforms (DSPs) 150, supply-side platforms (SSPs) 170, publishers 140, and websites 142. The example environment 100 may include many different client devices 110, MPC clusters 130, DSPs 150, SSPs 170, publishers 140, and websites 142.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, or a gaming device or gaming console.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for presentation to a user of the client device 110.

Some publishers 140 use a supply side platform ("SSP") 170 to manage the process of obtaining digital components for digital component slots of its resources and/or applications. An SSP 170 is a technology platform implemented in hardware and/or software that automates the process of obtaining digital components for the resources and/or applications. An SSP 170 can interact with one or more demand side platforms "DSPs" 150 to obtain information that can be used to select a digital component for a digital component slot. As described in more detail below, this information can include a criterion, which can also be referred to as a selection criterion or selection parameter, that represents or specifies an amount that a digital component provider 160 is willing to provide for presentation of a digital component of the digital component provider 160. Each publisher 140 can have a corresponding SSP 170 or multiple SSPs 170. Some publishers 140 may use the same SSP 170.

Digital component providers 160 can create (or otherwise publish) digital components that are presented in digital component slots of publisher's resources and applications. The digital component providers 160 can use a DSP 150 to manage the provisioning of its digital components for presentation in digital component slots. A DSP 150 is a technology platform implemented in hardware and/or software that automates the process of distributing digital components for presentation with the resources and/or applications. A DSP 150 can interact with multiple exchanges on behalf of digital component providers 160 to provide digital components for presentation with the resources and/or applications of multiple different publishers 140. In general, a DSP 150 can receive requests for digital components (e.g., from an SSP 170 directly or by way of an exchange), generate (or select) a selection parameter for one or more digital components created by one or more digital component providers based on the request, and provide data related to the digital component (e.g., the digital component itself) and the selection parameter to an SSP 170.

The ways in which SSPs 170 select digital components and the ways in which DSPs 150 distribute personalized digital components (e.g., generate selection parameters and/or the selection parameters themselves) have historically included using user information (e.g., browsing information, interest group information, etc.) obtained from third-party cookies, which are cookies dropped on the client device by a domain that differs from the domain of the web page being rendered on the client device. However, browsers are blocking the use of third party cookies, making it more difficult to select and provide personalized digital components, meaning that computing resources and bandwidth may be wasted by selecting and distributing content to users that is not of interest to the users. To overcome this problem, privacy preserving techniques that enable the use of user interest group information, while impeding the tracking of users across domains, and while preventing the leakage of user information across computing systems, can be used. The techniques described in this document protect this user information from being shared or leaked to other parties.

In some cases, it is beneficial to a user to receive digital components related to web pages, application pages, or other electronic resources previously visited and/or interacted with by the user. In order to distribute such digital components to users, the users can be assigned to interest groups when the users visit particular resources or perform particular actions at the resource (e.g., interact with a particular item presented on a web page or add the item to a virtual cart). An interest group is a set of users that have been identified as interested in a same topic based on browsing behavior, self-reported interests and/or information posted to a social network page. For example, an interest group of "football" may include users that have been identified as interested in football (e.g., by visiting a football related web page). In some implementations, the interest groups can be generated by and/or updated/maintained by the digital component providers 160 or a DSP 150 or SSP 170 on behalf of the digital component providers 160. For example, each digital component provider 160 can assign users to their user groups when the users visit electronic resources of the digital component providers 160. More specifically, when a user visits a particular page of the digital component provider's website, such as a product information page, the digital component provider may add that user to an interest group that includes users interested in the product described on that page. In some implementations, the interest groups can be generated by the publisher 140. For example, each publisher 140 can assign users to their user groups when the users visit electronic resources 145 of the publisher's 140 website 142. More specifically, when a user visits a particular page of the publisher's website, such as a Hawaii vacation page, the publisher may add that user to an interest group that includes users interested in Hawaii vacation.

To protect user privacy, a user's interest group membership is preferably maintained only at the user's client device 110, e.g., by one of the applications 112. In a particular example, a web browser can maintain a list of interest group identifiers ("interest group list") for a user using the web browser. The interest group list can include an interest group identifier for each interest group to which the user has been added. The digital component providers 160 or publisher 140 that create the interest groups can specify the interest group identifiers for their interest groups. The interest group identifier for an interest group can be descriptive of the group (e.g., gardening group) or a code that represents the group (e.g., an alphanumeric sequence that is not descriptive). The interest group list for a user can be stored in secure storage at the client device 110 and/or can be encrypted when stored.

When the application 112 presents a resource or application content related to a digital component provider 160, the resource can request that the application 112 add one or more interest group identifiers to the interest group list. In response, the application 112 can add the one or more interest group identifiers to the interest group list and store the interest group list securely. As described in more detail below, the application 112 can send the interest group identifiers in the interest group list to the MPC cluster 130 along with a request for content, e.g., a request for one or more digital components. Rather than send the plaintext (readable data that is unencrypted or otherwise unprotected) values of the interest group identifiers, the application 112 can encrypt the interest group identifiers and send the encrypted interest group identifiers to the MPC cluster 130 so that unintended recipients of the interest group identifiers cannot access the plaintext values of the interest group identifiers.

The MPC cluster 130 includes multiple computing systems that perform a multi-party computation process to select a digital component based on one or more interest group identifiers and additional information. In this example, the MPC cluster 130 includes a first computing system S1 and a second computing system S2. The computing systems S1 and S2 can be owned and operated by the same party (e.g., a browser developer, application developer, or industry group) or by different parties (e.g., one operated by a browser developer and the other operated by an industry group). Other quantities of computing systems can also be used as long as the quantity is greater than one.

Using MPC to select a digital component based on interest group identifiers protects the privacy of the user by preventing any party (including the party operating the computing systems of the MPC cluster 130) from determining which groups the user belongs to. The MPC process, along with cryptographic techniques, also prevents other parties from accessing the confidential information of the SSPs 170 and the DSPs 150. Example processes for using MPC and encryption techniques for selecting and distributing content are illustrated in FIGS. 2 and 3.

Figure 2:
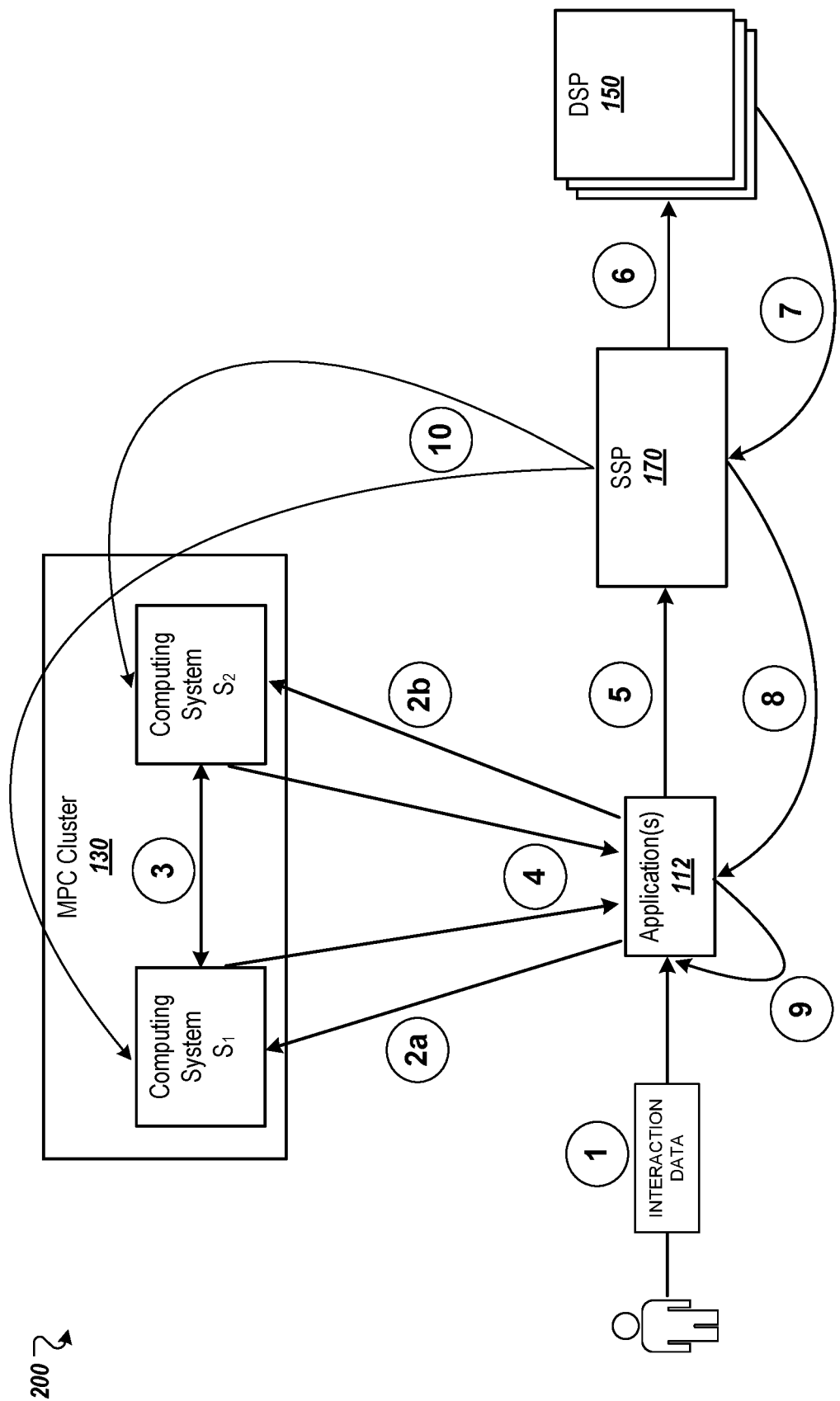
FIG. 2 depicts a data flow of a method for selecting content and providing content to a client device.
Figure 3:
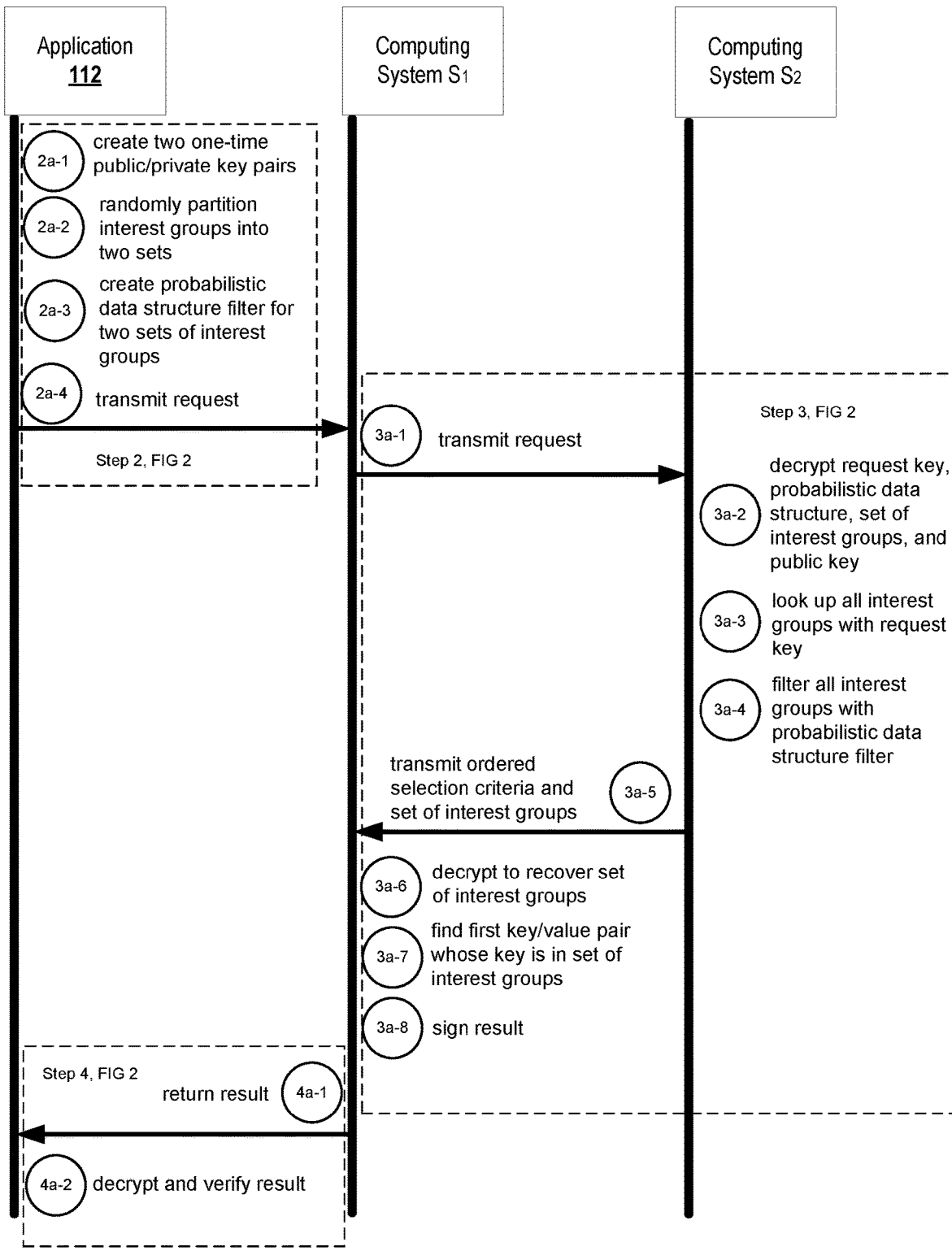
FIG. 3 is a swim lane diagram that illustrates a portion of an example process for selecting content.

FIG. 2 is a data flow diagram of a privacy preserving method 200 for selecting content and providing content to a client device. Operations of method 200 may be performed by various components of the system 100. For example, operations of method 200 can be performed by computing systems S1 and S2 of MPC cluster 130, SSP 170, and DSPs 150 in communication with client device 110 and application 112.

The method 200 begins with step 1, performed by application 112 of client device 110. In step 1, a user of client device 110 instructs application 112 to navigate to a particular page. For example, a user of client device 110 (for example, a smartphone) can click on a link that instructs application 112 (for example, a web browser) to navigate to, for example, a home page for a news website about birds. After application 112 navigates to the particular page, application 112 transmits two different types of requests in parallel (e.g., without waiting for a response to any one type of request). These requests are requests for (1) selection criteria for a set of digital components related to one or more particular groups that include the user and (2) selection criteria for a digital component identified based on a context of the page (or other online resource, such as a native application interface) currently being rendered and/or presented at the client device. The particular group can be, for example, an interest group, or another group of users to which the user of client device 110 belongs. The interest group can be associated with a particular entity, category, or other topic of interest in which users of the group are determined to be interested. The selection criteria can be, for example, a user rating, a rating provided by a content provider, an interest score, or a bid, among other criteria. The requests include information that allow for filtering of groups and/or selection criteria. Such information is described in further detail with respect to FIG. 3.

The method continues with step 2, which includes step 2a and step 2b. In step 2a, the application 112 generates and transmits a first request to S1, and in step 2b the application 112 generates and transmits a second request to S2. The requests sent to S1 and S2 can both be requests for selection criteria of digital components relevant to a group (e.g., an interest group) that includes the user of the client device. The generation and transmission of these requests is discussed in detail below with reference to FIG. 3. Steps 2a and 2b occur in parallel. Generally, steps 2a and 2b can be symmetrical processes, and any description of step 2a applies equally to step 2b, where step 2a is performed with respect to one subset of groups that include the user and step 2b is performed with respect to another subset of groups that include the user. The subset of groups sent to S1 will differ from the subset of groups sent to S2 as one way of preventing S1 and S2 from colluding to identify or track the user.

The method continues with step 3, in which the two computing systems S1 and S2 of MPC cluster 130 execute a secure 2-party computation (2PC) protocol to identify the selection criteria for one or more digital components that are related to one or more interest groups that include the user. During this 2PC process, S1 and S2 exchange information, and access a two stage cache to identify the relevant selection criteria. Each of S1 and S2 obscure information about the user/client device from the other computing system, such that neither computing system has a full set of information related to the user/client device, which prevents the computing systems from tracking the user across websites. Further details of this process are provided below with respect to FIG. 3.

The method continues with step 4, in which application 112 receives responses for each of steps 2a and 2b. Each response may contain sets of selection criteria for 0 or 1 group (e.g., interest group). The responses, which can be referred to as selection criteria sets, can include data such as an identifier for a particular interest group, a selection value for the particular interest group (e.g., a selection value that is eligible for use in selecting a digital component for a user that is a member of the particular interest group, which can also be referred to as a selection criterion), and other data associated with the particular interest group, the user's interaction, or the website to which application 112 navigated. Each selection criteria set can correspond to a digital component for which the selection criteria in the selection criteria set applies. For example, a response can be in the format of {IG_ID, post_revshare_bid, other_metadata}, where IG_ID represents an identifier for the interest group, post_revshare_bid represents a selection value (e.g., bid value), and other_metadata represents other data associated with the interest group, the corresponding digital component or the selection value. For example, the post_revshare_bid can include the digital component, data identifying the digital component or instructions for obtaining the digital component from a remote server, e.g., a URL or other link to the location of the digital component. In another example, this digital component or instructions can be included in the metadata. At the end of step 4, application 112 may receive between 0 and 2 selection criteria sets for interest groups that the user and/or browser is a member of. Further details of this process are provided below with respect to FIG. 3.

The method continues with step 5, in which application 112 transmits a contextual digital component request (a "third request") to SSP 170. For example, application 112 (in this example, a web browser) can transmit a request for a contextual digital component to SSP 170. The contextual digital component request can include contextual signals with which a relevant digital component can be identified. A contextual signal can be, for example, the category of content presented on a particular website or webpage being rendered/presented at the client device, the country or language of the user of the client device 110 (e.g., as specified by client device settings), among other factors. Step 5 can be performed in parallel with step 2.

The method continues with step 6, in which SSP 170 forwards the contextual digital component request to any number of DSPs 150. For example, SSP 170 can forward the request to several DSPs 150, each of which will have an opportunity to respond to the request with candidate selection criteria for a digital component. A candidate selection criterion can be, for example, a contextual selection value, or a selection value for a particular contextual signal. The contextual selection value can represent or specify an amount that a digital component provider 160 is willing to provide for presentation of a digital component of the digital component provider 160. The DSP 150 can select or determine the candidate selection value on behalf of the digital component provider 160.

The method continues with step 7, in which one or more DSPs 150 respond to the request with candidate selection criteria for a digital component identified using the contextual signals. For example, DSP 150 can respond to SSP 170's request with a contextual selection value and/or one or more contextual signals.

Additionally, one or more DSPs 150 can optionally return one or more group selection criteria (e.g., selection criteria sets) for a predicted group of the user or for another group for which the digital component corresponding to the selection criteria is eligible to be distributed. The DSPs 150 are not provided with information identifying groups that include the user. Rather, the DSPs use the contextual signals included in the contextual digital component request to predict an interest group that likely includes the user, and return a given selection criterion (e.g., selection value) for the predicted interest group. The selection value can be used in selecting the corresponding digital component for users that are members of the interest group.

For example, one or more DSPs 150 can use the contextual signals to predict one or more interest groups that include the user, and return one or more interest group selection value sets to be cached, or otherwise stored, by the MPC cluster 130 for responding to future interest group requests, such as the process described in in step 2a and step 2b, that may be issued by other browsers in the future. These interest group selection criteria sets can each include information such as an identifier of an interest group that is predicted to include the user, a selection value, a digital component or instructions for obtaining a digital component to which the selection value applies, a marketing factor, or information regarding the pacing of a content item campaign. For example, an interest group selection criteria set can be in the form of {IG_ID, pre_revshare_bid_price, TTL, pacing info}, where IG_ID represents an identifier of an interest group, pre_revshare_bid_price represents a selection value before any revenue sharing occurs, TTL represents a time-to-live, i.e. the maximum timespan that the MPC cluster may cache the bid, and pacing_info represents information regarding the pacing of a content item campaign relative to the overall budget and predicted efficacy of the content item. The prediction of an interest group that includes the user can be performed, for example, by inputting the contextual signals into a machine learning model that is trained to output predicted interest groups based on contextual signal inputs.

The interest group selection criteria set serves as an obligation that, in the future, subject to factors such as TTL and pacing information supplied, the DSP 150 authorizes SSP 170 and MPC cluster 130 to submit a bid with the indicated selection value for future interest group requests 2a and 2b that contain request parameters similar to those in the current contextual request step 5 and step 6. For example, if an application 112 submits an interest group request (such as in steps 2a or 2b) indicating signals that match for example IG_ID and signals in the current contextual request, such as a website URL, location, language, etc., DSP 150 can authorize SSP 170 and the MPC cluster 130 to submit the selection value for an interest group selection value set having a particular value.

Furthermore, DSP 150 can predict which set of interest groups, identified for example, by IG_IDs, may be associated with users who will visit the current website to which application 112 was directed, and submit interest group selection criteria set in advance. The submitted selection value sets can be cached by the MPC cluster 130 to reduce the latency and DSP 150 server load in responding to future interest group selection criteria requests. For example, if a subsequent interest group selection criterion request includes parameters matching the parameters of the interest group selection criteria sets submitted in advance and cached, the MPC cluster 130 can simply respond using the cached selection criteria set.

For example, DSP 150 can use historical user interaction data or other historical data to speculatively generate interest group selection values or selection value sets, or predictively bid on interest groups for users who will visit the current website to which application 112 was directed. For example, if DSP 150 determines from historical data that users who will visit the current bird news website to which application 112 was directed are generally associated with interest groups for camping, nature, and outdoor gear, DSP 150 can speculatively generate selection values for those interest groups, and store those selection values in the cache of the MPC Cluster 130, as discussed below with reference to step 10.

The method continues with step 8, in which SSP 170 applies several filtering criteria to the candidate selection criteria received, and provides a response to the contextual digital component request. SSP 170 can apply filters such as buyer exclusion and/or creative exclusion to the candidate selection criteria received. For example, SSP 170 can exclude particular digital component providers on a list either provided to SSP 170 by the publisher 140 or maintained by SSP 170 from providing bids. In another example, SSP 170 can exclude particular content items on a list either provided to SSP 170 or maintained by SSP 170 from being included as candidates. Once SSP 170 has filtered the candidate selection criteria, SSP 170 can calculate a selection value by applying particular pricing rules, either provided to SSP 170 or maintained by SSP 170. For example, SSP 170 can calculate a post revenue sharing selection value by applying pricing rules provided by a DSP 150, and conduct a selection process from among the candidates. For example, SSP 170 can conduct an auction among contextual content item selection values specified by the candidate selection criteria, and return the winning, or highest, contextual content item selection value, together with the calculated selection value to application 112. For example, the SSP 170 can provide the calculated selection value and digital component (or instructions for retrieving the corresponding to the selection value to the application 112.

In some implementations, the SSP 170 can also respond to the contextual digital component request with a given selection criterion for a group predicted to include the user. For example, the SSP 170 can apply any processing and/or rules discussed above, and provide selection values or selection criteria sets for any number of interest groups that are predicted to include the user by the DSPs 150. In this way, the client device 110 is provided with selection values for one or more interest group selection criteria sets even if the 2PC process performed by the MPC Cluster 130 fails to return any selection criteria for an interest group that includes the user as a member. For example, if the cache of the MPC cluster 130 does not include any selection criteria for any interest group that includes the user when the application 112 sends the requests to S1 and S2 in 2a and 2b, respectively, the MPC cluster 130 will be unable to respond to the application 112 with any selection criteria. In this situation, the given selection criterion for the interest group predicted to include the user can still be provided in response to the contextual digital component request so that the application 112 still has at least one interest group selection criteria set to evaluate even though the MPC Cluster 130 failed to respond with any interest group selection criteria sets.

The method continues with step 9, in which application 112 runs a final selection process to identify a digital component to display at the client device 110. In some implementations, application 112 can run an auction to select the content item to be presented at client device 110 by selecting the selection criteria set (or digital component) having the selection value, e.g., selection criterion, with the highest value. For example, the auction can be run using the winning contextual selection value and corresponding digital component (e.g., a candidate selection criterion from the candidate selection criteria) from step 8 as provided by SSP 170, any interest group selection criteria sets (e.g., interest group selection criterion specifying between zero and two interest group bids) received from the computing systems S1 and/or S2, and the predicted selection criteria, such as given selection criteria (e.g., a given selection criterion specifying a given selection value for an interest group predicted to include the user) received from the SSP 170 responsive to the contextual digital component request. Application 112 filters the predicted selection criteria in order to consider only the selection criteria that is associated with interest groups to which the user and/or browser belong. Because application 112 has already received the calculated selection values for the contextual digital component request from SSP 170 and the computing systems S1 and S2 of MPC cluster 130, application 112 can conduct a simple selection process such as a first price auction to choose the candidate selection value with the highest post revenue sharing value. Application 112 can then render the digital component associated with the winning selection value.

The method can continue with step 10, in which SSP 170 updates the interest group selection criteria maintained by the computing systems S1 and S2 of MPC cluster 130. SSP 170 performs step 10 by transmitting a first stage key and a second stage lookup table (LUT) to computing systems S1 and S2 of MPC cluster 130.

For example, SSP 170 can first apply filtering criteria to submitted interest group selection criteria and apply pricing rules to calculate a resulting selection value in a similar process to the process described with respect to step 8. SSP 170 can then create a composite message from all signals provided in the contextual request that are also interest group request signals, such as a particular URL, location, language, among other signals. SSP 170 then serializes the composite message into a byte array to create a cryptographic message that represents the request signals and other request information. For example, SSP 170 can cryptohash the byte array into a fixed size digital digest, using the SHA256 algorithm. For purposes of discussion within this document, this digital digest can be referred to IG_Request_Key.

The computing systems S1 and S2 of MPC cluster 130 each maintain a 2-stage LUT cache. For example, the first stage can be keyed by SHA256(IG_Request_Key) truncated to n bits. The second stage itself can be a LUT whose key is $HMAC_{SHA256}$(IG_Request_Key, IG_ID), where IG_ID represents an identifier for a particular interest group $HMAC_{SHA256}$ represents a hash-based message authentication code constructed from the SHA-256 hash function. The second stage cache value can be stored in the form of {post_revshare_bid, metadata}. The metadata includes information such as TTL values, pacing information, identifiers for a buyer account, values for pre-revenue sharing selection values and post-revenue sharing selection values, among other information. SSP 170 can digitally sign at least a portion of the cryptographic message using a secret key that can be verified only by application 112, or publicly verifiable. For example, SSP 170 can digitally sign the entire set of metadata with its private key. Computing systems S1 and S2 of MPC cluster 130 then independently update their 2-stage LUTs using the received first stage key and second stage LUT.

In addition to sending the candidate selection criteria for interest group selection criteria (e.g., selection criteria sets), to computing systems S1 and S2 of MPC cluster 130 in step 10, SSP 170 may optionally send interest group selection criteria to application 112 as part of step 8, which already includes the candidate selection criteria having the highest value. In this option, for each final selection process performed by application 112 as part of step 9, application 112 selects the highest selection value from among several sets of selection values including one or more of the following, if available: a contextual selection value received in step 8; an interest group selection value received in step 2a that was cached in a cache of MPC cluster 130; an interest group selection value received in step 2b that was cached in a cache of MPC cluster 130; and/or interest group selection values received in step 8 that have not been cached (application 112 further filters these bids based on the true list of interest groups that user of client device 110 is associated with).

FIG. 3 depicts a swim lane diagram that illustrates an example process 300 for selecting content. The numbering of the steps in process 300 corresponds to the numbering of the steps in method 200. For example, steps 2a-1, 2a-2, 2a-3 and 2a-4 of process 300 are exemplary steps that may form part of step 2a of method 200. Similarly, steps 3a-1 through 3a-8 are exemplary steps that may form part of step 3 of method 200 and steps 4a-1 and 41-s are exemplary steps that may form part of step 4 of method 200. Operations of method 300 may be performed by various components of the system 100. For example, operations of method 300 can be performed, at least in part, by computing systems S1 and S2 of MPC cluster 130 in communication with client device 110 and application 112.

In some implementations, steps 2a and 2b are completed in parallel, and are symmetrical processes. As such, FIG. 3 is discussed with reference to step 2a, but is equally applicable to step 2b with the operations of the computing systems reversed. For example, in the reversed situation, S1 would swap places with S2 in FIG. 3, but the rest of FIG. 3 would remain the same to carry out step 2b.

In step 2a-1, application 112 generates, e.g., randomly, two public/private key pairs: public_key 1, public_key2, private key 1, and private_key2. For example, these public/private key pairs can be Elliptic Curve Cryptography (ECC) key pairs, such as NIST P-256 key pairs. Application 112 only shares public_key1 with computing system S1 and only shares public_key2 with computing system S2 such that public_key1 and public_key2 are ephemeral semi-public_keys. Application 112 also generates a nonce, or an arbitrary number that can be used just once in a cryptographic communication, for the request.

In Step 2a-2, application 112 randomly partitions the true list of interest groups to which the user of client device 110 belongs into two sets, $G_1$ and $G_2$. Assume $G_2=\{g_{2,1}, \ldots g_{2,k}\}$ is the set of interest groups randomly allocated to $G_2$. Assuming that the user of client device 110, and by extension, application 112, is associated with n interest groups, each interest group has equal probability to be put into $G_1$ or $G_2$. In some implementations, sets $G_1$ and $G_2$ are not of equal size. Recall that the application 112 preferably maintains a list of interest groups that include the user, so in this step, the application can delineate that list of interest groups in to two subsets of interest groups. In some implementations, the two subsets of interest groups have non-overlapping membership. In some implementations, the two subsets of interest groups have overlapping memberships.

Any interest group that application 112 is associated with has a non-zero probability p to be absent from $G_1$ or $G_2$. The probability that a random interest group not associated with application 112 is present in $G_1$ or $G_2$ is the false positive rate (FPR). Therefore the process to create $G_1$ is ε-differentially private where ε=log(1−p/FPR). For example, if FPR is 1% and p is 50%, then have ε=log(50)=3.9. Similarly, the process to create $G_2$ is also ε-differentially private with ε=3.9.

Application 112 transforms $G_2$ into $G_2^T$ by applying a keyed-pseudorandom function to each interest group in $G_2$ with a composite key, such as {IG_Request_Key, nonce}. For example, $G_2^T=\{x:$ HMAC(HMAC(IG_Request_Key, x), nonce), $\forall \chi \in G_2\}$, where the function HMAC(clear_text, secret_key) calculates a keyed message authentication code. This algorithm is a keyed-hash message authentication code, or a specific type of message authentication code (MAC) that involves both a cryptographic hash function and a secret cryptographic key.

In step 2a-3, application 112 can then select a probabilistic data structure, such as a bloom filter, implementation and appropriate parameters, including the FPR for the structure. In this particular example, application 112 can then create a bloom filter $G_1'$ and $G_2'$ for sets G1 and G2 respectively. Due to FPR, $G_1 \subset G_1'$, $G_2 \subset G_2'$, $|G_1|<<|G_1'|$, and $|G_2|<<|G_2'|$. By using a probabilistic data structure, each subset of interest groups that actually include the user have a set of interest groups that do not include the user added so as to help preserve the privacy of the user, for example, by making it more difficult for any system that obtained one of the subsets from being able to identify or track the user through fingerprinting.

For example, the application 112 can create a probabilistic data structure, such as a bloom filter or cuckoo filter, $G_2'$ for $G_2$ T. The bloom filter uses k hash functions to hash an interest group identifier IG_ID into m array positions. For example, $h_j$: IG_ID→[0, m) where $1<=j<=k$. H(IG_ID) can be defined by H(IG_ID)=HMAC(IG_Request_Key, IG_ID), where the result is represented in base-m representation . . . $H_3H_2H_1$. $h_m$(IG_ID) is thus defined as the m-th digit in H(IG_ID), i.e., $H_m$.

In step 2a-4, the application 112 sends a request to computing system S1 with a single parameter in an encrypted message. The parameter, for example, can be PubKeyEncrypt(Stage_1_Lookup_Key $\|G_2'\|$ PubKeyEncrypt($G_2^T$, S1)$\|$ public_key2$\|$ nonce, S2). In this equation, $\|$ represents any lossless reversible method of composing a complex message from one or more simple messages. For example, $\|$ can represent concise binary object representation or protocol buffer methods.

In this particular example, Stage_1_Lookup_Key is SHA256(IG_Request_Key) truncated to n bits, but other appropriate keys can be used. In this particular example, PubKeyEncrypt(clear_text, domain) is the encryption result of applying a probabilistic public_key encryption algorithm to encrypt clear_text using a public_key fetched from the domain. The public_key encryption algorithm used by application 112 is often based on the ECC. For example, the public_key encryption algorithm can be NIST P-256.

In step 3a-1, computing system S1 is unable to perform any processes using the received request other than forward it to computing system S2 due to the encryption of the request using the public_key that application 112 fetched from with computing system S2 with the assumption that computing system S2 will keep the corresponding private key strictly confidential. By forwarding the request, computing system S1 hides the IP address of the client device executing application 112 from computing system S2 such that computing system S2 cannot use any IP addresses of applications on client devices that are associated with interest group requests to track users, providing an additional layer of privacy protection.

In step 3a-2, computing system S2 decrypts the received request using its own private key to recover a number of parameters. For example, the parameters include Stage_1_Lookup_Key, $G_2'$ (i.e., the bloom filter constructed for $G_2^T$), PubKeyEncrypt($G_2^T$, S1), i.e., the encrypted $G_2^T$ that only computing system S1 can decrypt, public_key2 created by application 112 for the current request, and nonce.

Even in the event that computing system S2 colludes with, for example, SSP 170, computing system S2 still will not be able to use the client device's IP address common to the interest group and contextual requests to correlate interest group requests with contextual requests from the application based on IP address. This protection is even more apparent when Stage_1_Lookup_Key has a limited number of bits.

In step 3a-3, computing system S2 queries its 2-stage look up table ("LUT") using Stage_1_Lookup_Key. The result is a classical LUT whose keys are HMAC(IG_Request_Key, IG_ID). In other words, the computing system S2 uses the Stage_1_Lookup_Key from the decrypted request to query the LUT for matching entries.

In step 3a-4, computing system S2 filters the LUT with the bloom filter $G_2'$. Assuming that the false positive rate of the bloom filter is 1%, roughly 1% of entries in the LUT will pass through the filter. The number of entries in the LUT is roughly $2^{-n}$ of all entries cached by computing system $S_2$. Therefore, n controls the cost of communication and computation between step 2a-8 to step 2a-11 inclusively. The smaller n is, the higher communication and computation cost are, and the higher the number entries in LUT associated with different IG_Request_Key is, which makes it more difficult for computing system S2 to collude with SSP 170 to correlate interest group and contextual requests based on common targeting signals in both types of content item requests.

In step 3a-5, computing system S2 orders the filtered entries according to a selection criterion. For example, computing system S2 can order the filtered entries using a post revenue sharing selection value (or bid value), from highest first to lowest. For each entry, computing system S2 prepares a key/value pair, where the key is HMAC(HMAC (IG_Request_Key, IG_ID), nonce). The value is PubKeySign (PubKeyEncrypt(metadata_for_IG, public_key2), MPC2), where PubKeySign(clear_text, domain) is a function used to concatenate clear_text with a digital signature that domain creates by applying a digital signature algorithm (such as ECDSA NIST P-256) over clear text using its private key. The metadata_for_IG for an interest group IG can include the selection criteria set for a digital component corresponding to the interest group. As described above, the selection criteria set can include the selection value, the digital component or instructions for obtaining the digital component, etc. PubKeyEncrypt is an encryption function performed on the metadata of the interest group using public key public_key2 prevents computing system S1 from learning the selection value for a particular interest group identified by IG_ID, which can be used by computing system S1 to infer signals such as the website URL from which the request was generated. PubKeySign prevents computing system S1 from impersonating computing system S2 to generate a false result. Thus, computing system S2 transforms the set of interest group bids into an ordered set of key/value pairs. Computing system S2 then sends the ordered list of key/value pairs and PubKeyEncrypt($G_2^T$, S1) to computing system S1.

In step 3a-6, computing system S1 decrypts PubKeyEncrypt($G_2^T$, S1) to recover $G_2^T$ in cleartext. For example, computing system S1 decrypts PubKeyEncrypt using its private key corresponding to the public_key provided by application 112 only to computing system S1.

In step 3a-7, computing system S1 selects the winning interest group using $G_2^T$ to find the first key/value pair from the list of ordered key/value pairs whose key is in $G_2^T$. Because the ordered list is already in order of highest to lowest post revenue sharing selection values, computing system S1 can simply query $G_2^T$ and select the first key/value pair from the ordered list whose key is in $G_2^T$ to select the interest group that is in the true list of interest groups with which application 112 is associated having the highest post revenue sharing bid price without having access to the actual values of the key/value pairs. The selected key/value pair is the result.

In step 3a-8, computing system S1 signs the selected key/value pair with its own private key for verification by application 112 later. For example, computing system S1 can sign the winning key/value pair with its private key corresponding to the public key that application 112 provides only to computing system S1.

In step 4a-1, computing system S1 transmits the selected key/value pair, or result, back to application 112.

In step 4a-2, application 112 decrypts and validates the result as follows.

Application 112 verifies that the result is encrypted and signed by computing system S1. For example, the key can be HMAC(HMAC(IG_Request_Key, Winning_IG_ID), nonce). The value can be PubKeySign(PubKeyEncrypt (metadata for_IG, public_key2), S2). Application 112 recovers Winning_IG_ID and verifies that it is a member of $G_2$. Application 112 is able to verify that Winning_IG_ID is a member of set $G_2$ because application 112 knows IG_Request_Key, nonce, and $G_2$. Application 112 verifies that the value is encrypted and signed by computing system S2. Application 112 then decrypts the value with private_key2 to recover metadata_for_IG.

The cryptographic process 300 provides additional privacy and security safeguards. During this process, computing system S2 receives the bloom filter $G_2'$ in cleartext. Based on previous analysis, the bloom filter $G_2'$ is differentially private. In addition, computing system S2 receives Stage_1_Lookup_Key in cleartext, i.e. SHA256(IG_Request_Key) truncated to n bits. Additionally, computing system S1 sees only client IP addresses in cleartext. Thus, neither of the computing systems of the MPC cluster can access the entirety of a user's data, and cannot guess at the user's identity.

Figure 4:
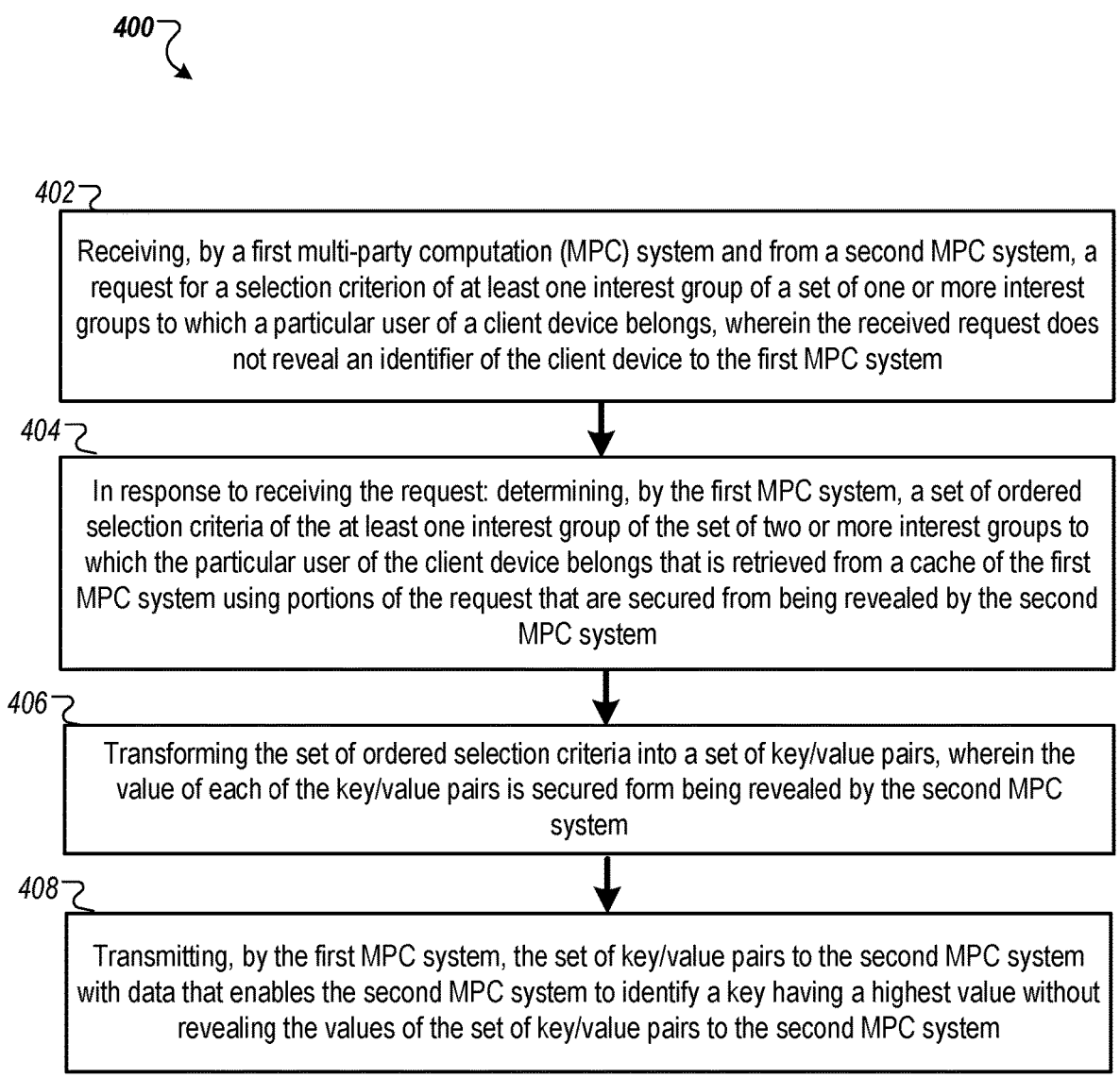
FIG. 4 is a flow diagram of an example method for selecting content.

FIG. 4 is a flow diagram of an example privacy preserving process 400 for selecting content. In some implementations, process or method 400 can be performed by one or more systems. For example, process 400 can be implemented by client device 110, application 112 and MPC cluster 130 of FIGS. 1-3. In particular, process 400 can be implemented by a system comprising one or more processors 510 and one or more memory elements, e.g., the storage device 530 of FIG. 5) including instructions that, when executed, cause the one or more processors to perform operations including the steps of process 400. In some implementations, the process 400 can be implemented as instructions stored on a non-transitory computer readable medium, and when the instructions are executed by a computing system (e.g., a distributed computing system), the instructions can cause the computing system to perform operations of the process 400. Preferably the computing system comprises one or more servers. A distributed computing system can include multiple servers connected by a network.

Process 400 begins with receiving, by a first multi-party computation (MPC) server of an MPC cluster (e.g., S2 of FIG. 1, FIG. 2 and FIG. 3) and from a second MPC server of the MPC cluster (e.g., S1 of FIG. 1, FIG. 2 and FIG. 3), a request for a selection criterion of at least one interest group of a set of two or more interest groups to which a particular user of a client device belongs, wherein the received request does not reveal an identifier of the client device to the first MPC server (402). For example, as described above with respect to FIG. 2 and FIG. 3 step 3a-1, computing system S2 can receive, from computing system S1, a request for an interest group bid. The request does not reveal the IP address of application 112, an identifier of the client device, to computing system S2. This has the technical effect of protecting user privacy and preserving the security of user data. For example, only a portion of the interest groups that include the user as a member is provided to each MPC server of the MPC cluster. Thus, neither MPC server can determine the user's complete user interest group membership. The use of a probabilistic data structure provides an addition technical effect of reducing the data size of the request sent to each MPC server, while further preserving user privacy and data security. Aggregated over many requests, e.g., thousands or millions per day, this results in substantial bandwidth and latency savings, and reduces the drain on the batteries of mobile devices that may send the requests.

Process 400 continues by responding to the received request by determining, by the first MPC server, a set of ordered selection criterion of the at least one interest group of the set of two or more interest groups to which the particular user of the client device belongs (404). In some implementations, the set of ordered selection criterion is retrieved from a cache of the first MPC server using portions of the request that are secured from being accessed in an unencrypted or plain text form or otherwise revealed by the second MPC server. For example, as described above with respect to FIG. 2 and FIG. 3, steps 3a-2 through 3a-5, computing system S2 (i.e., the first MPC server) can determine an ordered set of interest group bids retrieved from the 2-stage LUT of computing system S2 by using portions of the request. This has the technical effect of maintaining data security and user privacy during the selection process. Using this approach prevents either MPC cluster from obtaining the complete interest group membership of the user. In addition, this approach prevents the MPC servers from obtaining confidential data about DSPs that provide selection values for interest groups.

Process 400 continues with transforming the set of ordered selection criterion into a set of key/value pairs, wherein the value of each of the key/value pairs is secured from being revealed by the second MPC (406). For example, as described above with respect to FIG. 2 and FIG. 3, steps 3a-2 through 3a-5, computing system S2 can transform the set of ordered interest group bids into a set of key/value pairs. This also has the technical effect of maintaining data security and user privacy during the selection process. Using this approach prevents either MPC cluster from obtaining the complete interest group membership of the user. In addition, this approach prevents the MPC servers from obtaining confidential data about DSPs that provide selection values for interest groups.

Process 400 continues with transmitting, by the first MPC server, the set of key/value pairs to the second MPC with data that enables the second MPC server to identify a key having a highest value without revealing the values of the set of key/value pairs to the second MPC server (408). For example, as described above with respect to FIG. 2 and FIG. 3, steps 3a-2 through 3a-5, computing system S2 can transmit the ordered list of bids as a set of key/value pairs to computing system S1 with data that enables computing system S1 to identify a key having a highest value without allowing computing system S1 to access the value. This has the technical effect of preserving user privacy and data security. In addition, the amount of data transmitted from the MPC server to the client device is reduced by only sending data for the winning interest group rather than each interest group that includes the user as a member.

In some implementations, process 400 can include receiving, by the first MPC server and from a content distribution system that differs from the first MPC server and the second MPC server, a given selection criterion of a given interest group, in the context of a set of conditions under which the given interest group is predicted, by the content distribution system, to include the particular user of the client device and caching, by the first MPC server and in the cache of the first MPC server, the given selection criterion of the given interest group that is predicted to include the particular user of the client device and in association with the applicable context. This has the technical effect of faster selection of digital components based on interest group membership. By caching selection criteria for digital components that are distributed based on interest group membership, the MPC servers can more quickly identify eligible digital components (e.g., those for interest groups that include the user as a member) and select a winning digital component based on the cached selection values.

For example, as described above with respect to FIG. 2, step 10, SSP 170 can send, to computing systems S1 and S2, a speculative, or predictive selection value provided by DSP 150. Each of the computing systems S1 and S2 can independently update its respective 2-stage LUT.

In some implementations, process 400 further includes receiving, by the content distribution system, a content request submitted by the client device, generating, in response to the content request, a candidate selection criterion responsive to the content request, determining, based on the content request, zero or more interest groups that are predicted to include the particular user of the client device, generating the given selection criteria of the given interest groups based on the determination that the given interest group are predicted to include the particular user of the client device, transmitting, by the content distribution system, the candidate distribution criterion and the given distribution criteria to the client device, and transmitting, by the content distribution system and to the first MPC server, the given distribution criterion of the given interest group, but not the candidate distribution criterion. For example, DSP 150 can receive a content request submitted by application 112, determine that the user of client device 110 on which application 112 runs is likely to be part of a particular interest group, and generate a predictive bid for the interest group. This has the technical effect of enabling the application to complete a selection process for a digital component to be displayed by the application using both interest group membership and contextual data for the digital component presentation environment without leaking user data to other parties, thereby improving data security throughout a robust digital component selection process that improves the user experience. In addition, but performing the final selection process at the client device based on parallel requests, the selection process can be completed more quickly, which may prevent errors that could occur in situations where digital components must be selected in milliseconds.

In some implementations, process 400 further includes receiving, by the second MPC server, a first encrypted request that is inaccessible by, for example cannot be decrypted by, the second MPC server, forwarding, by the second MPC server, the first encrypted request to the first MPC server, receiving, from the second MPC server, the set of key/value pairs, identifying, by the second MPC server and without revealing the values of the key/value pairs, a given key/value pair having the highest value, generating a first signed response to the first encrypted request that includes the given key/value pair, wherein the first signed response is signed with a private key of the second MPC server, and transmitting the first signed response to the client device responsive to the first encrypted request. This has the technical effect of maintaining data security and user privacy during the selection process. Using this approach prevents either MPC cluster from obtaining the complete interest group membership of the user. In addition, this approach prevents the MPC servers from obtaining confidential data about DSPs that provide selection values for interest groups. In addition, using encryption and signatures in the request preserves data security and prevents fraud that could occur between the MPC server and the client device. Using the signature to verify the response ensures that the encrypted response has not been modified.

For example, computing system S1 can receive an encrypted request that is not accessible or cannot be decrypted by computing system S1 and forward the request to computing system S2. Computing system S2 can then provide an ordered set of key/value pairs to computing system S1 without revealing the value of the pairs and generate a response to computing system S1 that includes the ordered set of key/value pairs and signing the values. Once computing system S1 selects the winner interest group bid, computing system S1 transmits the selected key/value pair to application 112.

In some implementations, process 400 further includes receiving, by the client device, the first encrypted and signed response transmitted by the second MPC server, verifying, by the client device, that the first encrypted and signed response is signed by the first MPC server, recovering, by the client device, a first interest group from the first signed response, verifying, by the client device, that the first interest group includes the particular user, verifying, by the client device, that the value of the given key/value pair is signed by the first MPC server, decrypting, by the client device, the value of the given key/value pair to recover a first selection criterion, receiving, by the client device, the candidate selection criterion and the given selection criterion from the content distribution system, selecting, by the client device, a controlling selection criterion from among the first selection criterion, the given selection criterion, and the candidate selection criterion. This has the technical effect of preserving user privacy and data security, and preventing fraud.

For example, as described above with respect to FIG. 3, steps 4a-1 through 4a-2, application 112 can receive a signed response from computing system S1 and recover the winning interest group bid from the response. Application 112 can verify that the value of the given key/value pair in the response is encrypted and signed by computing system S2. Application 112 can then decrypt the value of the key/value pair to recover the winning interest group bid and receive other bids, including zero or one interest group bid from computing system S2 and zero or one contextual bid and zero or more interest group bids from SSP 170.

In some implementations, process 400 further includes delineating, by the client device, interest groups that include the particular user into a first set of interest groups and a second set of interest groups that differs from the first set of interest groups, transmitting, by the client device, the first encrypted request to the second MPC server, the first encrypted request including a first set of interest groups that include the particular user, transmitting, by the client device, a second encrypted request to the first MPC server, the second encrypted request including a second set of interest groups that include the particular user, receiving, by the client device, a second signed response transmitted by the first MPC server, verifying, by the client device, that the second signed response is signed by the second MPC server, recovering, by the client device, a specified interest group from the signed response, verifying, by the client device, that the specified interest group includes the particular user, verifying, by the client device, that the value of the given key/value pair is signed by the second MPC server, decrypting, by the client device, the value of the given key/value pair to recover a third selection criterion, wherein selecting the controlling selection criterion comprises selecting the controlling selection criterion from among the first selection criterion, the given selection criterion, the candidate selection criterion, and the third selection criterion. This has the technical effect of . . . preserving user privacy and data security, and preventing fraud.

For example, as described above with respect to FIG. 2 step 2 and FIG. 3, steps 2a-1 through 2a-2, application 112 of client device 110 can separate the interest groups into two different sets. As described above with respect to FIG. 3, steps 2a-1 through 3a-1, application 112 of client device 110 can transmit an encrypted request to computing system S2 and computing system S2 can transmit a second encrypted request to computing system S1. As described above with respect to FIG. 3, steps 3a-5 through 4a-2, application 112 can receive a signed result from computing system S2 and verify that the value of the result was encrypted and signed by computing system S1. Application 112 can then decrypt the result and verify that the specified interest group in the result includes the particular user because application 112 has the true list of the interest groups to which the user belongs.

Figure 5:
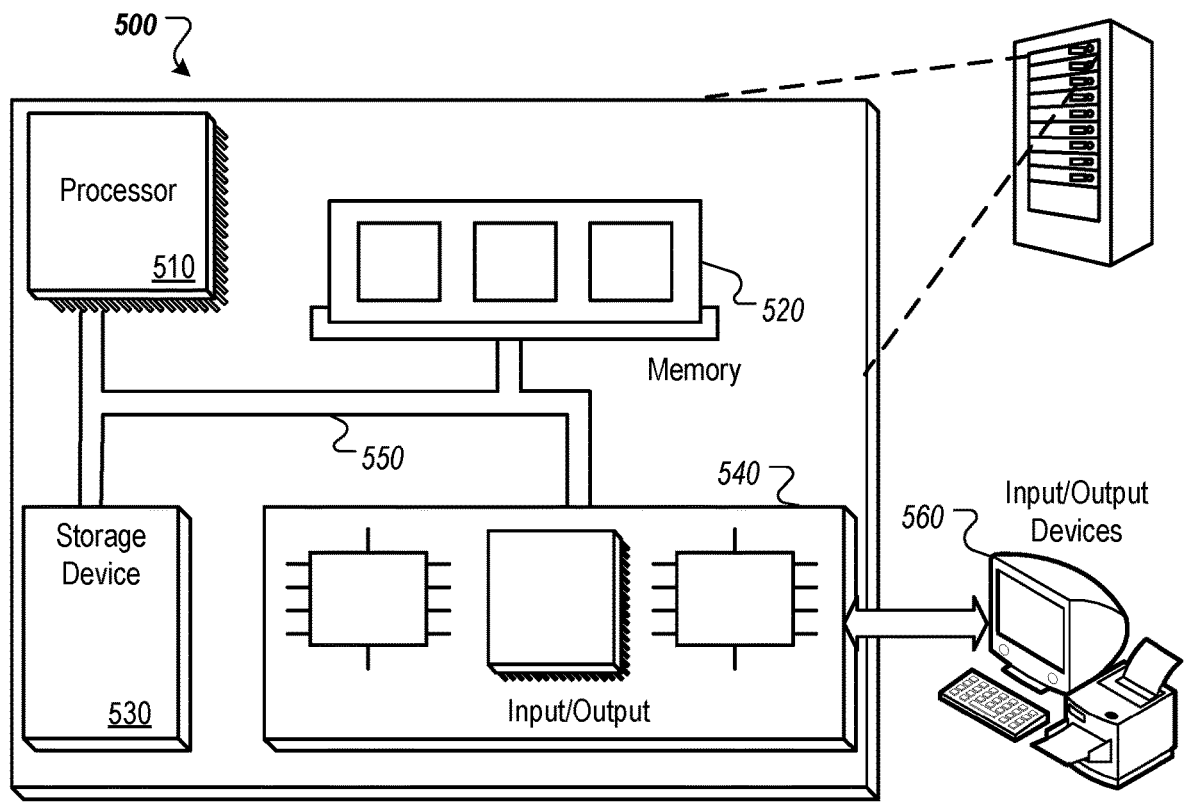
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Media does not necessarily correspond to a file. Media may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

All of the features of each of the processes, methods, systems and apparatus described herein, including system 100, method 200, process 300, process 400 and system 500, optionally apply *mutatis mutandis* to the other processes, methods, system and apparatus described herein. Merely as an example, features of method 200 and process 300 optionally apply *mutatis mutandis* to process 400.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by a first multi-party computation (MPC) server of an MPC cluster and from a second MPC server of the MPC cluster, a request for a selection criterion of at least one interest group of a set of two or more interest groups to which a particular user of a client device belongs, wherein the received request does not reveal an identifier of the client device to the first MPC server;
   in response to receiving the request:
      determining, by the first MPC server, a set of ordered selection criterion of the at least one interest group of the set of two or more interest groups to which the particular user of the client device belongs that is retrieved from a cache of the first MPC server using portions of the request that are secured from being revealed by the second MPC server;
      transforming the set of ordered selection criterion into a set of key/value pairs, wherein the value of each of the key/value pairs is secured from being revealed by the second MPC server; and
      transmitting, by the first MPC server, the set of key/value pairs to the second MPC server with data that enables the second MPC server to identify a key having a highest value without revealing the values of the set of key/value pairs to the second MPC server.

2. The method of claim 1, further comprising:
   receiving, by the first MPC server and from a content distribution system that differs from the first MPC server and the second MPC server, a given selection criterion of a given interest group that is predicted, by the content distribution system, to include the particular user of the client device; and
   caching, by the first MPC server and in the cache of the first MPC server, the given selection criterion of the given interest group that is predicted to include the particular user of the client device.

3. The method of claim 2, further comprising:
   receiving, by the content distribution system, a content request submitted by the client device;
   generating, in response to the content request, a candidate selection criterion responsive to the content request;
   determining, based on the content request, the given interest group that is predicted to include the particular user of the client device;

generating the given selection criterion of the given interest group based on the determination that the given interest group is predicted to include the particular user of the client device;

transmitting, by the content distribution system, the candidate distribution criterion and the given distribution criterion to the client device; and transmitting, by the content distribution system and to the first MPC server, the given distribution criterion of the given interest group, but not the candidate distribution criterion.

4. The method of claim 1, further comprising:

receiving, by the second MPC server, a first encrypted request that is inaccessible by the second MPC server;

forwarding, by the second MPC server, the first encrypted request to the first MPC server;

receiving, from the first MPC server, the set of key/value pairs;

identifying, by the second MPC server and without revealing the values of the key/value pairs, a given key/value pair having the highest value;

generating a first encrypted and signed response to the first encrypted request that includes the given key/value pair, wherein the first signed response is signed with a private key of the second MPC server; and transmitting the first encrypted and signed response to the client device responsive to the first encrypted request.

5. The method of claim 4, further comprising:

receiving, by the client device, the first encrypted and signed response transmitted by the second MPC server;

verifying, by the client device, that the first encrypted and signed response is signed by the first MPC server;

recovering, by the client device, a first interest group from the first signed response;

verifying, by the client device, that the first interest group includes the particular user;

verifying, by the client device, that the value of the given key/value pair is signed by the first MPC server;

decrypting, by the client device, the value of the given key/value pair to recover a first selection criterion;

receiving, by the client device, the candidate selection criterion and the given selection criterion from the content distribution system; and selecting, by the client device, a controlling selection criterion from among the first selection criterion, the given selection criterion, and the candidate selection criterion.

6. The method of claim 5, further comprising:

delineating, by the client device, interest groups that include the particular user into a first set of interest groups and a second set of interest groups that differs from the first set of interest groups;

transmitting, by the client device, the first encrypted request to the second MPC server, the first encrypted request including a first set of interest groups that include the particular user;

transmitting, by the client device, a second encrypted request to the first MPC server, the second encrypted request including a second set of interest groups that include the particular user;

receiving, by the client device, a second signed response transmitted by the first MPC server;

verifying, by the client device, that the second signed response is signed by the second MPC server;

recovering, by the client device, a specified interest group from the signed response;

verifying, by the client device, that the specified interest group includes the particular user;

verifying, by the client device, that the value of the given key/value pair is signed by the second MPC server; and decrypting, by the client device, the value of the given key/value pair to recover a third selection criterion, wherein selecting the controlling selection criterion comprises selecting the controlling selection criterion from among the first selection criterion, the given selection criterion, the candidate selection criterion, and the third selection criterion.

7. The method of claim 4, further comprising:

receiving, by the first MPC server, a second encrypted request that is inaccessible by the first MPC server;

forwarding, by the first MPC server, the second encrypted request to the second MPC server;

receiving, from the second MPC server, a different set of key/value pairs;

identifying, by the first MPC server and without revealing the values of the key/value pairs in the different set, a particular key/value pair having the highest value;

generating a second signed response to the second encrypted request that includes the particular key/value pair, wherein the first signed response is signed with a private key of the second MPC server; and transmitting the second signed response to the client device responsive to the second encrypted request.

8. A system comprising:

one or more processors; and one or more memory elements including instructions that, when executed, cause the one or more processors to perform operations including:

receiving, by a first multi-party computation (MPC) system server of an MPC cluster and from a second MPC server of the MPC cluster, a request for a selection criterion of at least one interest group of a set of two or more interest groups to which a particular user of a client device belongs, wherein the received request does not reveal an identifier of the client device to the first MPC server;

in response to receiving the request:

determining, by the first MPC server, a set of ordered selection criterion of the at least one interest group of the set of two or more interest groups to which the particular user of the client device belongs that is retrieved from a cache of the first MPC server using portions of the request that are secured from being revealed by the second MPC server;

transforming the set of ordered selection criterion into a set of key/value pairs, wherein the value of each of the key/value pairs is secured from being revealed by the second MPC server; and transmitting, by the first MPC server, the set of key/value pairs to the second MPC server with data that enables the second MPC server to identify a key having a highest value without revealing the values of the set of key/value pairs to the second MPC server.

9. The system of claim 8, the operations further comprising:

receiving, by the first MPC server and from a content distribution system that differs from the first MPC server and the second MPC server, a given selection criterion of a given interest group that is predicted, by the content distribution system, to include the particular user of the client device; and caching, by the first MPC server and in the cache of the first MPC server, the given selection criterion of the given interest group that is predicted to include the particular user of the client device.

10. The system of claim 9, the operations further comprising:
receiving, by the content distribution system, a content request submitted by the client device;
generating, in response to the content request, a candidate selection criterion responsive to the content request;
determining, based on the content request, the given interest group that is predicted to include the particular user of the client device;
generating the given selection criterion of the given interest group based on the determination that the given interest group is predicted to include the particular user of the client device;
transmitting, by the content distribution system, the candidate distribution criterion and the given distribution criterion to the client device; and
transmitting, by the content distribution system and to the first MPC server, the given distribution criterion of the given interest group, but not the candidate distribution criterion.

11. The system of claim 8, the operations further comprising:
receiving, by the second MPC server, a first encrypted request that is inaccessible by the second MPC server;
forwarding, by the second MPC server, the first encrypted request to the first MPC server;
receiving, from the first MPC server, the set of key/value pairs;
identifying, by the second MPC server and without revealing the values of the key/value pairs, a given key/value pair having the highest value;
generating a first encrypted and signed response to the first encrypted request that includes the given key/value pair, wherein the first signed response is signed with a private key of the second MPC server; and
transmitting the first encrypted and signed response to the client device responsive to the first encrypted request.

12. The system of claim 11, the operations further comprising:
receiving, by the client device, the first encrypted and signed response transmitted by the second MPC server;
verifying, by the client device, that the first encrypted and signed response is signed by the first MPC server;
recovering, by the client device, a first interest group from the first signed response;
verifying, by the client device, that the first interest group includes the particular user;
verifying, by the client device, that the value of the given key/value pair is signed by the first MPC server;
decrypting, by the client device, the value of the given key/value pair to recover a first selection criterion;
receiving, by the client device, the candidate selection criterion and the given selection criterion from the content distribution system; and
selecting, by the client device, a controlling selection criterion from among the first selection criterion, the given selection criterion, and the candidate selection criterion.

13. The system of claim 12, the operations further comprising:
delineating, by the client device, interest groups that include the particular user into a first set of interest groups and a second set of interest groups that differs from the first set of interest groups;
transmitting, by the client device, the first encrypted request to the second MPC server, the first encrypted request including a first set of interest groups that include the particular user;
transmitting, by the client device, a second encrypted request to the first MPC server, the second encrypted request including a second set of interest groups that include the particular user;
receiving, by the client device, a second signed response transmitted by the first MPC server;
verifying, by the client device, that the second signed response is signed by the second MPC server;
recovering, by the client device, a specified interest group from the signed response;
verifying, by the client device, that the specified interest group includes the particular user;
verifying, by the client device, that the value of the given key/value pair is signed by the second MPC server; and
decrypting, by the client device, the value of the given key/value pair to recover a third selection criterion, wherein selecting the controlling selection criterion comprises selecting the controlling selection criterion from among the first selection criterion, the given selection criterion, the candidate selection criterion, and the third selection criterion.

14. The system of claim 8, the operations further comprising:
receiving, by the first MPC server, a second encrypted request that is inaccessible by the first MPC server;
forwarding, by the first MPC server, the second encrypted request to the second MPC server;
receiving, from the second MPC server, a different set of key/value pairs;
identifying, by the first MPC server and without revealing the values of the key/value pairs in the different set, a particular key/value pair having the highest value;
generating a second signed response to the second encrypted request that includes the particular key/value pair, wherein the first signed response is signed with a private key of the second MPC server; and
transmitting the second signed response to the client device responsive to the second encrypted request.

15. A non-transitory computer storage medium encoded with instructions that when executed by a computing system cause the computing system to perform operations comprising:
receiving, by a first multi-party computation (MPC) server of an MPC cluster and from a second MPC server of the MPC cluster, a request for a selection criterion of at least one interest group of a set of two or more interest groups to which a particular user of a client device belongs, wherein the received request does not reveal an identifier of the client device to the first MPC server;
in response to receiving the request:
determining, by the first MPC server, a set of ordered selection criterion of the at least one interest group of the set of two or more interest groups to which the particular user of the client device belongs that is retrieved from a cache of the first MPC server using portions of the request that are secured from being revealed by the second MPC server;
transforming the set of ordered selection criterion into a set of key/value pairs, wherein the value of each of the key/value pairs is secured from being revealed by the second MPC server; and transmitting, by the first MPC server, the set of key/value pairs to the second MPC server with data that enables the second MPC server to identify a key having a highest value without revealing the values of the set of key/value pairs to the second MPC server.

16. The non-transitory computer storage medium of claim 15, the operations further comprising:

receiving, by the first MPC server and from a content distribution system that differs from the first MPC server and the second MPC server, a given selection criterion of a given interest group that is predicted, by the content distribution system, to include the particular user of the client device; and caching, by the first MPC server and in the cache of the first MPC server, the given selection criterion of the given interest group that is predicted to include the particular user of the client device.

17. The non-transitory computer storage medium of claim 16, the operations further comprising:

receiving, by the content distribution system, a content request submitted by the client device;

generating, in response to the content request, a candidate selection criterion responsive to the content request;

determining, based on the content request, the given interest group that is predicted to include the particular user of the client device;

generating the given selection criterion of the given interest group based on the determination that the given interest group is predicted to include the particular user of the client device;

transmitting, by the content distribution system, the candidate distribution criterion and the given distribution criterion to the client device; and transmitting, by the content distribution system and to the first MPC server, the given distribution criterion of the given interest group, but not the candidate distribution criterion.

18. The non-transitory computer storage medium of claim 15, the operations further comprising:

receiving, by the second MPC server, a first encrypted request that is inaccessible by the second MPC server;

forwarding, by the second MPC server, the first encrypted request to the first MPC server;

receiving, from the first MPC server, the set of key/value pairs;

identifying, by the second MPC server and without revealing the values of the key/value pairs, a given key/value pair having the highest value;

generating a first encrypted and signed response to the first encrypted request that includes the given key/value pair, wherein the first signed response is signed with a private key of the second MPC server; and transmitting the first encrypted and signed response to the client device responsive to the first encrypted request.

19. The non-transitory computer storage medium of claim 18, the operations further comprising:

receiving, by the client device, the first encrypted and signed response transmitted by the second MPC server;

verifying, by the client device, that the first encrypted and signed response is signed by the first MPC server;

recovering, by the client device, a first interest group from the first signed response;

verifying, by the client device, that the first interest group includes the particular user;

verifying, by the client device, that the value of the given key/value pair is signed by the first MPC server;

decrypting, by the client device, the value of the given key/value pair to recover a first selection criterion;

receiving, by the client device, the candidate selection criterion and the given selection criterion from the content distribution system; and selecting, by the client device, a controlling selection criterion from among the first selection criterion, the given selection criterion, and the candidate selection criterion.

20. The non-transitory computer storage medium of claim 19, the operations further comprising:

delineating, by the client device, interest groups that include the particular user into a first set of interest groups and a second set of interest groups that differs from the first set of interest groups;

transmitting, by the client device, the first encrypted request to the second MPC server, the first encrypted request including a first set of interest groups that include the particular user;

transmitting, by the client device, a second encrypted request to the first MPC server, the second encrypted request including a second set of interest groups that include the particular user;

receiving, by the client device, a second signed response transmitted by the first MPC server;

verifying, by the client device, that the second signed response is signed by the second MPC server;

recovering, by the client device, a specified interest group from the signed response;

verifying, by the client device, that the specified interest group includes the particular user;

verifying, by the client device, that the value of the given key/value pair is signed by the second MPC server; and decrypting, by the client device, the value of the given key/value pair to recover a third selection criterion, wherein selecting the controlling selection criterion comprises selecting the controlling selection criterion from among the first selection criterion, the given selection criterion, the candidate selection criterion, and the third selection criterion.

* * * * *